US011475786B2

(12) United States Patent
Lenger

(10) Patent No.: US 11,475,786 B2
(45) Date of Patent: Oct. 18, 2022

(54) GUITAR TRAINING DEVICE

(71) Applicant: James Lenger, Chicago, IL (US)

(72) Inventor: James Lenger, Chicago, IL (US)

(73) Assignee: STRUM PERFECT LLC, Chicago, IL (US)

( * ) Notice: Subject to any disclaimer, the term of this patent is extended or adjusted under 35 U.S.C. 154(b) by 0 days.

(21) Appl. No.: 17/314,341

(22) Filed: May 7, 2021

(65) Prior Publication Data

US 2022/0005613 A1    Jan. 6, 2022

Related U.S. Application Data

(63) Continuation of application No. 16/921,097, filed on Jul. 6, 2020, now Pat. No. 11,004,354.

(51) Int. Cl.
| | | |
|---|---|---|
| *G09B 15/06* | (2006.01) | |
| *G10G 5/00* | (2006.01) | |
| *G21B 1/05* | (2006.01) | |
| *H05H 1/04* | (2006.01) | |
| *G10D 3/00* | (2020.01) | |

(52) U.S. Cl.
CPC .............. *G09B 15/06* (2013.01); *G10G 5/005* (2013.01); *G21B 1/05* (2013.01); *H05H 1/04* (2013.01); *G10D 3/00* (2013.01)

(58) Field of Classification Search
CPC ..................................................... G10G 5/005
See application file for complete search history.

(56) References Cited

U.S. PATENT DOCUMENTS

| | | | | |
|---|---|---|---|---|
| 627,646 | A | | 6/1899 | Kuerschner |
| 1,156,925 | A | * | 10/1915 | Poehland ................. G10D 3/18 84/280 |
| D210,851 | S | * | 4/1968 | Wallace ......................... D17/20 |
| 4,251,016 | A | * | 2/1981 | O'Rafferty ............. G10G 5/005 224/250 |
| 4,630,763 | A | * | 12/1986 | Friedman ............... G10G 5/005 224/259 |
| D302,435 | S | | 7/1989 | Pearse |
| 4,852,448 | A | | 8/1989 | Hennessey |
| 4,966,062 | A | | 10/1990 | Driggers et al. |
| D381,356 | S | * | 7/1997 | Pelkey ............................ 84/328 |

(Continued)

OTHER PUBLICATIONS

International Search Report dated Jul. 28, 2021 in connection with PCT Patent Application No. PCT/US2021/040426 filed Jul. 6, 2021, 2 pages.

(Continued)

*Primary Examiner* — Robert W Horn
(74) *Attorney, Agent, or Firm* — McDonnell Boehnen Hulbert & Berghoff LLP

(57) ABSTRACT

A removable device for positioning a user's forearm and hand in relation to a guitar is provided. The removable device comprises: (i) a first strap overlying a first portion of the guitar and having attached thereto a first pad and a second pad; (ii) a second strap overlying a second portion of the guitar and joined to the first strap via a first connector, wherein the first connector is coupled to the guitar at a first point; and (iii) an adjustment mechanism overlying a third portion of the guitar and joined to the first strap, the second strap, the first connector, and a second connector, wherein the second connector is coupled to the guitar at a second point.

22 Claims, 5 Drawing Sheets

(56) References Cited

U.S. PATENT DOCUMENTS

| | | | |
|---|---|---|---|
| 6,005,175 A * | 12/1999 | Johnson | G10D 3/18 84/327 |
| 6,054,642 A | 4/2000 | Brooks | |
| 6,252,150 B1 | 6/2001 | Johnson | |
| 6,573,439 B2 | 6/2003 | Wilson | |
| 6,624,346 B2 | 9/2003 | Standish | |
| 6,703,546 B1 | 3/2004 | Wilson | |
| 7,205,468 B1 | 4/2007 | Johnson | |
| 7,390,950 B2 | 6/2008 | Hollander | |
| 7,470,842 B2 * | 12/2008 | Miller | G10G 5/005 84/329 |
| 7,897,857 B2 | 3/2011 | Lockwood | |
| 8,710,341 B2 * | 4/2014 | Bowen | G10G 5/005 84/327 |
| 9,190,041 B1 | 11/2015 | Miller | |
| 9,196,233 B2 | 11/2015 | Schulze | |
| 9,240,168 B1 * | 1/2016 | Steinberger | G10D 3/18 |
| 9,299,327 B1 * | 3/2016 | Steinberger | G10D 3/18 |
| 9,373,312 B1 * | 6/2016 | Block | G10G 5/005 |
| 9,460,693 B2 * | 10/2016 | Mynatt | G10G 5/005 |
| 9,805,699 B1 * | 10/2017 | Johnson | G10D 1/08 |
| 9,812,102 B2 * | 11/2017 | de Chadenedes | G10G 5/005 |
| 10,210,852 B2 * | 2/2019 | Nannen | G10G 5/005 |
| 10,262,635 B2 * | 4/2019 | Klusewitz | G10D 3/18 |
| 10,847,125 B1 | 11/2020 | Kim et al. | |
| 11,004,354 B1 * | 5/2021 | Lenger | G09B 15/06 |
| 2004/0094585 A1 | 5/2004 | Walker | A45F 3/14 224/257 |
| 2007/0044633 A1 | 3/2007 | Gregory | |
| 2014/0109749 A1 * | 4/2014 | Schulze | G10D 3/18 84/453 |
| 2019/0392796 A1 * | 12/2019 | Miyatake | G10G 5/005 |
| 2021/0272541 A1 * | 9/2021 | Warmack | G10D 3/18 |
| 2022/0005613 A1 * | 1/2022 | Lenger | G09B 15/006 |

OTHER PUBLICATIONS

Written Opinion of the International Searching Authority dated Jul. 28, 2021 in connection with PCT Patent Application No. PCT/US2021/040426 filed Jul. 6, 2021, 4 pages.

* cited by examiner

GUITAR TRAINING DEVICE

CROSS-REFERENCE TO RELATED APPLICATION

This application is a continuation of, and claims priority to, U.S. patent application Ser. No. 16/487,338 filed on Aug. 20, 2019, which is a U.S. National Phase Application under 35 U.S.C. § 371 of International Application No. PCT/US2018/019364 filed on Feb. 23, 2018, which claims the benefit of U.S. Provisional Patent Application No. 62/462,779, filed on Feb. 23, 2017, which are hereby incorporated by reference herein in their entirety.

FIELD

The disclosure relates to a removable device for positioning a guitar user's forearm and hand in relation to a guitar.

BACKGROUND

Novice guitar users and some that have been playing for many years, alike, tend to incorrectly position their strumming/picking hand and forearm in relation to the guitar. This improper positioning leads to a number of other issues when these guitar users play the guitar as well, including hitting the guitar itself, starting and stopping their strumming/picking hand and forearm unnecessarily, and playing the guitar rigidly, overall, by keeping their strumming/picking hand and forearm too stiff—among other such issues.

Accordingly, the present disclosure relates to a removable, portable, cost-effective, and convenient devices for positioning a guitar user's strumming/picking hand and forearm to improve forearm, wrist, and hand dexterity and competence, as well as overall playing ability and form.

SUMMARY

In one aspect, a removable device for positioning a user's forearm and hand in relation to a guitar is provided. The removable device includes: (i) a first strap overlying a first portion of the guitar and having attached thereto a first pad and a second pad; (ii) a second strap overlying a second portion of the guitar and joined to the first strap via a first connector, wherein the first connector is coupled to the guitar at a first point; and (iii) an adjustment mechanism overlying a third portion of the guitar and joined to the first strap, the second strap, the first connector and a second connector, wherein the second connector is coupled to the guitar at a second point.

In another aspect, another removable device for positioning a user's forearm and hand in relation to a guitar is provided. The removable device includes: (i) a first strap overlying a first portion of the guitar and having attached thereto a first pad and a second pad, and wherein the first strap comprises at least one elastic portion; (ii) a second strap overlying a second portion of the guitar and joined to the first strap via a first connector, wherein the first connector is coupled to the guitar at a first point, and wherein the second strap comprises at least one elastic portion; and (iii) an adjustment mechanism overlying a third portion of the guitar and joined to the first strap, the second strap, the first connector, and a second connector, wherein the second connector is coupled to the guitar at a second point, and wherein the second connector comprises at least one elastic portion.

In yet another aspect, another removable device for positioning a user's forearm and hand in relation to a guitar is provided. The removable device includes: (i) a first strap overlying a first portion of the guitar and having attached thereto a first pad and a second pad; (ii) a second strap overlying a second portion of the guitar and joined to the first strap via a first connector, wherein the first connector is coupled to the guitar at a first point; (iii) a third strap overlying a third portion of the guitar and joined to the first strap and the second strap via the first connector; (iv) a fourth strap overlying a fourth portion of the guitar and coupled to the guitar at a second point via a second connector; and (v) an adjustment mechanism overlying a fifth portion of the guitar and joined to the first strap, the second strap, the third strap, and the fourth strap.

DESCRIPTION

Figure 1:
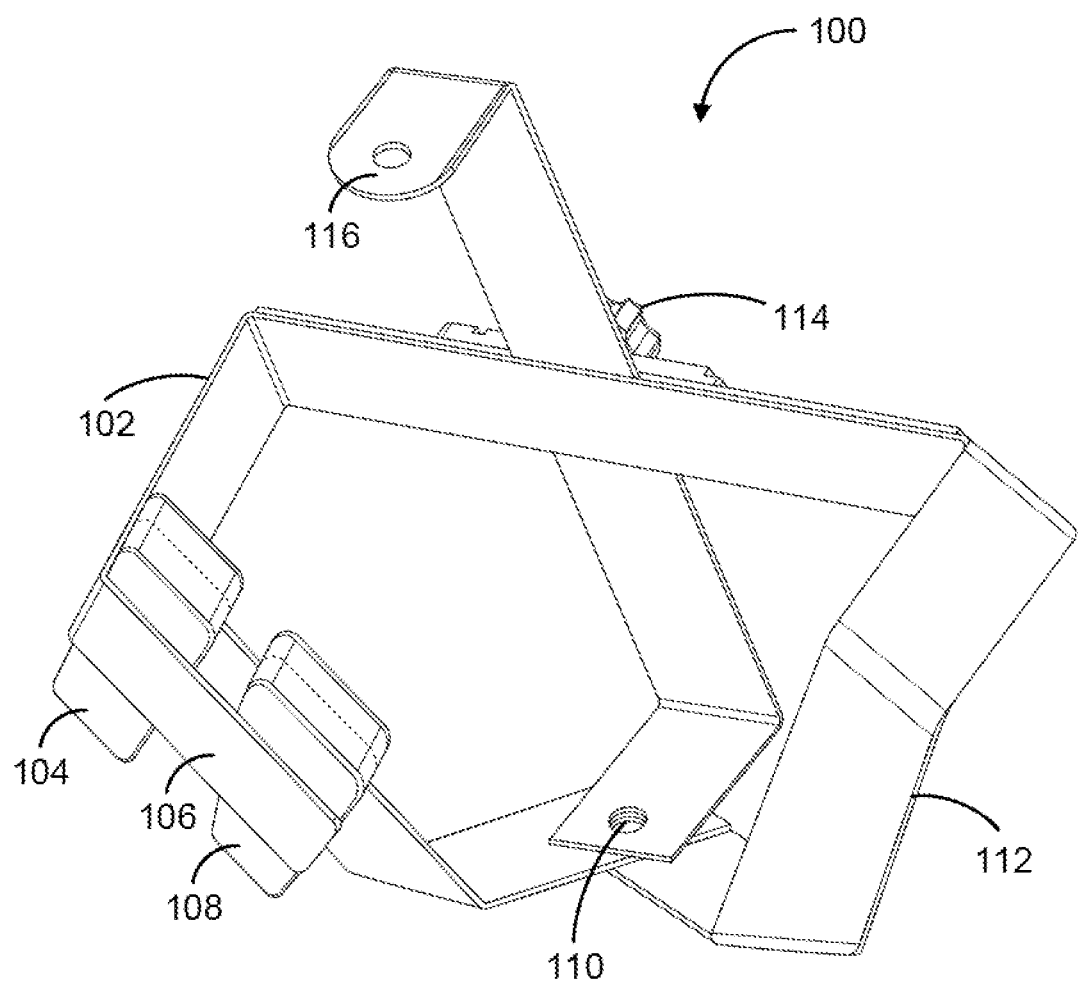
FIG. 1 is a removable device for positioning a user's forearm and hand in relation to a guitar.

The disclosure is directed to removable, portable, cost-effective, and convenient devices for positioning a guitar user's strumming/picking hand and forearm to improve forearm, wrist, and hand dexterity, as well as improving the user's overall playing ability and form.

In one aspect, the disclosed device counteracts a guitar user's inclination to incorrectly position their forearm and/or hand in relation to the guitar, as well as the problems that arise from such improper positioning and form. These problems include: (i) playing too rigidly (as it is often preferable to keep the strumming/picking hand and forearm looser and more dexterous); (ii) hitting the guitar itself while playing (which can lead to damaging the guitar, the user, or both); (iii) overplaying the guitar in the strumming or picking direction (e.g., going too far on either side of the strings when strumming up and down); and/or (iv) starting and stopping their strumming/picking hand and forearm unnecessarily—among other such issues. Moreover, these issues arise with novice guitar users and those that have been playing for many years, alike.

In one aspect, a device is disclosed that attaches to a guitar without any modification to the guitar itself and properly guides a user's forearm while the user is playing (e.g., picking and/or strumming) the guitar. In one aspect, the disclosed device holds a user's strumming/picking forearm against the guitar and increases their focus on their wrist with minimal forearm movement, thereby encouraging the guitar user to primarily use just their strumming/picking hand while playing the guitar. By doing so, the disclosed device encourages the guitar to narrowly focus on controlling and building acumen in their strumming/picking hand, instead of over-relying on the range and movement their forearm provides as well (which can often be counterproductive for playing and control). As detailed further below, the disclosed device also provides a guide for proper forearm direction and placement (and thereby also provides proper strumming/picking hand direction and placement). The disclosed device does so through, among other things, specifically shaped and angled pads attached to the device that guide and restrict the user's forearm while playing the guitar.

In one aspect, the device is made of materials that will not harm the surface, finish or other materials on the guitar itself. These materials include various cotton, leather, vinyl, and/or rubber materials commonly used in the guitar industry (e.g., in guitar straps), as well as other materials that provide support for the claimed device, but also do not harm the surfaces of the guitar. The device also attaches to the guitar using existing points of connection on the guitar (e.g., one or more strap buttons, and/or other hardware, openings, or controls on the guitar).

Further, although the illustration included in this application primarily illustrate the device in the context of a dreadnought shaped acoustic guitar, the claimed device can easily be adapted for any number of body shapes and styles of acoustic guitars (e.g., jumbo acoustic guitars, smaller body acoustic guitars, classical acoustic guitars, parlor guitars) made by a number of well-known acoustic guitar manufacturers (e.g., C. F. Martin®, Gibson®, Taylor®), over a number of specific model numbers (e.g., C. F. Martin® D-28, C. F. Martin® OM-28, C. F. Martin® D-28-12, Gibson® J-45, Gibson® J-200, Taylor® 314).

Additionally, the claimed device can also be adapted for any number of other types, styles, and shapes of other types of guitars (e.g., solid-body electric guitars, hollow-body electric guitars, electric bass guitars) made by a number of well-known electric and/or bass guitar manufacturers (e.g., Fender®, Gibson®), over a number of specific model numbers (e.g., Fender® Stratocaster®, Fender® Telecaster®, Fender® Jazz Bass®, Fender® Precision Bass®, Gibson® Les Paul®, Gibson® ES-335).

To do so, among other features, the disclosed device may be made up of one or more straps with one or more perforations to accommodate and/or allow access to one or more features of the guitar (e.g., controls, knobs, switches, and strap buttons on the guitar), as well as other mechanisms overlying different portions of the guitar, all over a number of configurations. In any event, the disclosed device is designed to help improve a guitar user's abilities, and may do so in a number of ways.

In one aspect, the disclosure is directed to a removable device for positioning a user's forearm and hand in relation to a guitar. The device includes a first strap overlying a first portion of the guitar and having attached thereto two pads to help position the user's strumming/picking forearm and hand. The first strap may be made out of various materials (including those mentioned above) and a number of similar and/or different materials may be interspersed throughout.

For example, in one embodiment, the first strap may be made out of cotton, nylon, or a combination of both materials, among other possibilities. In another aspect, at one end, the first strap may also have a first connector designed to connect to the guitar at a predetermined point. For example, many guitars have a strap button on the bottommost portion of the body to which the first strap may connect using a precut perforation designed to fit over the strap button. At that connecting end, the first strap may be made of and/or reinforced with one or more additional materials designed to improve the stability and/or longevity of the connection (e.g., a leather portion stitched to the end of the first strap, which contains a precut hole that fits securely over the strap button). In another aspect, in between the first strap and the first connector, one or more elastic portions may also be incorporated to improve, among other things, the ability of the first strap to stretch and move more freely to fit different guitar shapes and sizes, as well as allow the first strap to not pull unnecessarily against the first connector and strap button, if the first strap is pulled or tightened.

In another aspect, the first strap may have attached thereto one or more pads. Additionally or alternatively, on the portion of the first strap between the two pads, one or more elastic portions may also be incorporated to improve, among other things, the accommodation of different forearm sizes to fit between the two pads, as well as to allow the first strap to not pull unnecessarily against the first connector and strap button (or other portions of the disclosed device), if the guitar user moves their forearm between the two pads (e.g., while playing the guitar). These pads can also be made from a number of materials and shaped and/or sized depending on the configuration of the device, the user, the guitar, or all three, among other possibilities. For example, to increase comfort and ease of use, these pads may be made out of foam or other compressible, soft materials and/or covered in materials that are easy to clean and/or provide additional comfort, including vinyl, cotton, and/or rubber, among other possibilities. In yet another aspect, these pads may be shaped and/or sized differently to ensure that the user's forearm is best positioned to have the user's wrist and strumming/picking hand is also properly positioned in relation to the guitar (e.g., directly over the strings, at the proper angle). To do so, in one aspect, one or more of these pads may be designed to promote the user's arm in a specific direction and be contoured to securely fit to the angles and/or dimensions of the user's forearm. Other examples are possible.

In another aspect, these pads may also contain a securing portion that overlies the user's forearm when the forearm is placed between the two pads, thereby further securing the user's forearm between the two pads. This securing portion may be made from a variety of materials (e.g., cotton, nylon, elastic, or some combination thereof) and attached to the two pads using a number of different mechanisms that provide a custom fit for different guitar users (e.g., a nylon strap that attaches to one or both pads using a hook and loop fastener mechanism). In another aspect, the securing portion may not require either or both of these pads to secure the user's forearm. For example, the securing portion may be attached directly to the first strap without any pads and still be used to restrict the motion of the user's forearm and/or hold the user's forearm close to the guitar body. In this configuration, the securing portion may be made from a variety of materials and attached to the first strap using a number of different mechanisms that provide a custom fit for different guitar users (e.g., a nylon strap that attaches on one or both ends to the first strap using a hook and loop fastener mechanism).

In another aspect, the device includes a second strap overlying a second portion of the guitar. The second strap may also be joined to the first strap via the first connector, which is coupled to the guitar at a first point (e.g., a strap button on the bottom most portion of the guitar). The strap itself may be made out of various materials (including those mentioned above) and a number of similar and/or different materials may be interspersed throughout. For example, in one embodiment, like the first strap, the second strap may be made out of cotton, nylon, or a combination of both materials, among other possibilities.

In another aspect, at one end, the second strap may also be joined to the first connector. For example, using the strap button on the bottom-most portion of the body, the first strap and the second strap may be joined using a first connector made of one or more materials that connect to the bottommost strap button using a precut perforation designed to fit over and secure to the strap button. At the connecting end, the first strap, second strap, or both may be made of one or more additional materials designed to improve the stability and/or longevity of the connection. In another aspect, in between the second strap and the first connector mechanism, one or more elastic portions may also be incorporated to improve, among other things, the ability of the second strap to stretch to fit different guitar shapes and sizes, as well as allow the second strap to not pull unnecessarily against the first connector and strap button, if the second strap is pulled or tightened.

In another aspect, the device includes an adjustment mechanism for tightening and/or loosening the device once the device is placed on the guitar. In one aspect, the adjustment mechanism overlies a third portion of the guitar and is joined to the first strap, the second strap, the first connector, and a second connector. The second connector, like the first connector, may be coupled to the guitar at a certain point.

Unlike the first connector, however, the second connector is designed to connect to the guitar at a predetermined point at, approximately, the portion of the guitar where the guitar neck meets the guitar body. For example, the second connector may be connected to the guitar using a strap button on the heel block of the guitar neck or any other portion of the guitar body approximately where the guitar neck meets the guitar body (e.g., the guitar neck plate or an upper portion of the guitar body), among other possibilities. Furthermore, the second connector may attach to the guitar body and/or guitar neck using something other than a strap button.

For example, the second connector may attach to the guitar using an adjustable lanyard that extends around from the back of the guitar body and attaches to one or more features on the top portion of the guitar (e.g., placed under the fretboard, inside the sound hole of an acoustic guitar and/or other openings on the tops of other types of guitars, onto one or more controls located on the guitar top, etc.). In a further aspect, the second connector may be adjustable and may attach to these features on the top portion of the guitar using materials and/or mechanisms that do not harm or require any modification of the guitar itself (e.g., rubberized and/or plastic hooks akin to those used on some classical guitar straps).

Concerning the adjustment mechanism itself, it can take many forms, depending on the guitar to which it is attached and the desired adjustment features. For example, in one aspect, the adjustment mechanism may be a geared adjustment mechanism that tightens and/or loosens the straps and/or connectors to which it is joined and/or attached. In another example, the adjustment mechanism may be an adjustable buckle and/or pull-strap system (e.g., a ladder lock system, a ratchet strap and cam buckle strap system, a hook and loop fastener mechanism, and/or other strap systems).

In another aspect, the adjustment mechanism may be joined to the first strap, second, first connector, and/or second connector using one or more elastic materials and/or one or more additional materials designed to improve the stability and/or longevity of the connection. Such materials may also improve the ability of the device components to more securely fit different guitar shapes and sizes. These materials may also allow the adjustment mechanism to not pull unnecessarily against the other components of the disclosed device and/or parts of the guitar itself, when the adjustment mechanism is loosened or tightened. Other examples are possible.

Concerning the first connector and second connector, either or both may take various forms. For example, either or both of the connectors may be components that are specifically configured to attach to other components of the device (e.g., perforated elastic ends on one or more of the device straps). In additional or alternative embodiments, either or both of the connectors may be components that resemble other components of the device.

For example, either or both connectors may be made of strap components like the first strap and/or second strap and overlies different portions of the guitar. For example, the device may contain a third strap overlying a third portion of the guitar and joined to the first strap and/or the second strap via the first connector, a fourth strap overlying a fourth portion of the guitar and coupled to the guitar at a second point via the second connector, and/or both, among other possibilities. Further, in between the first connector and/or second connector and whatever each is joined to, there may be one or more elastic portions to improve, among other things, the ability of the device components to stretch to fit different guitar shapes and sizes, as well as allow the device components to not pull unnecessarily against each other, the guitar's components, and/or both.

In yet another aspect, one or more components of the disclosed device may be made of and/or have attached thereto one or more specific materials to improve the performance of the device when attached to the guitar, while also not harming any surface or component of the guitar. For example, one or more of the device components (e.g., one or more of the device straps) may be made of and/or have attached thereto a variety of low friction materials that allow the device components to move around on and/or interact with the guitar's surface without harming the guitar. These materials may include: velour, velvet, synthetic or natural furs, microfibers, and/or cotton, among other possibilities. In other examples, one or more of the device components (e.g., one or more of the device straps) may be made of and/or have attached thereto a variety of high friction materials that allow the device components to avoid moving around on the guitar's surface, while still not requiring any modification to the guitar itself and without harming the guitar. These materials may include: rubber and/or rubber materials designed to not harm the guitar's surface (e.g., rubber designed to not adversely react with a nitrocellulose finish, thereby harming the guitar's finish), among other possibilities.

Descriptions of several figures are provided below to further illustrate the features described above (and more).

FIG. 1 provides a removable device for positioning a user's forearm and hand in relation to a guitar according to the disclosure. The features described herein can involve environments, operations, and functionalities that are configured or formatted differently, include additional or fewer components, include different types of components, and relate to one another in different ways. The device 100 attaches to a guitar and positions a guitar user's strumming/picking hand and forearm to improve forearm, wrist, and hand dexterity and competence, as well as overall playing ability and form, all of which is self-contained and does not require major modification of existing systems and/or the guitar itself, to do so.

In an example embodiment, as illustrated in FIG. 1, the device 100 may be made up of a first strap 102, a first pad 104, a second pad 108, a securing portion 106, a first connector 110, a second strap 112, an adjustment mechanism 114, and a second connector 116. FIG. 1, however, depicts only one example configuration, and other configurations are possible (and may even be preferable).

In this embodiment, the first strap 102, the first pad 104, the second pad 108, the securing portion 106, the first connector 110, the second strap 112, the adjustment mechanism 114, the second connector 116, and/or other components may be made of cotton, leather, vinyl, and/or plastics typically used guitar straps, but it should be understood that any of these components may be made of other materials.

Furthermore, the first strap 102, the first pad 104, the second pad 108, the securing portion 106, the first connector 110, the second strap 112, the adjustment mechanism 114, the second connector 116, and/or other components may also be modified to interact with a variety of guitar types, styles, and configurations (e.g., acoustic guitars, electric guitars, bass guitars, etc.), and the shape and/or dimensions of any component of device 100 can be modified to fit in or integrate with any guitar.

Turning to the operation of device 100, the device 100 fits over a guitar body with the first strap 102 overlying a first portion of the guitar with the first pad 104 and the second pad 108 aligning where the guitar user's forearm would be normally be placed when playing. The first pad 104 and the second pad 108 also have attached thereto the securing portion 106 that further secures the guitar user's forearm when the forearm is placed between the first pad 104 and the second pad 108. The first strap 102 also joins the first connector 110, which is coupled to a first point of the guitar body (shown here as a strap button perforation that connects to a strap button on the bottom-most portion of the guitar body).

The device 100 also securely fits over the guitar body with the second strap 112 overlying a second portion of the guitar. The second strap 112 also joins the first connector 110, which is coupled to the first point of the guitar body (shown here, again, as a strap button perforation that would connect to a strap button on the bottom-most portion of the guitar body).

The device 100 also contains the adjustment mechanism 114 overlies a third portion of the guitar (e.g., is placed behind the guitar body) and is connected to the first strap 102 and the second strap 112. Adjustment mechanism 114 also joins the second connector 116, which is coupled to a second point of the guitar body (shown here, as a strap button perforation that connects to a strap button on the top-most portion of the guitar body, near where the guitar body joins the guitar neck).

In operation, once the device 100 is attached to the guitar, the user can adjust the tension of the device components by adjusting the adjustment mechanism 114. For example, in this embodiment, the adjustment mechanism 114 is illustrated as a geared mechanism. In this embodiment, the user would turn the knob of the adjustment mechanism 114 clockwise, which would in turn pull one or more of the first strap 102, the first connector 110, the second strap 112, the second connector 116, and/or the adjustment mechanism 114 more taunt in relation to one another, thereby further tightening and securing the device 100 in relation to the guitar body. Additionally or alternatively, once the device 100 is sufficiently and securely attached in relation to the guitar body, before playing the guitar using device 100, the user may place the forearm of their strumming/picking hand in between the first pad 104 and the second pad 108, and then further secure the forearm in between the first pad 104 and the second pad 108 using the securing portion 106. Other examples and configurations are possible.

Figure 2:
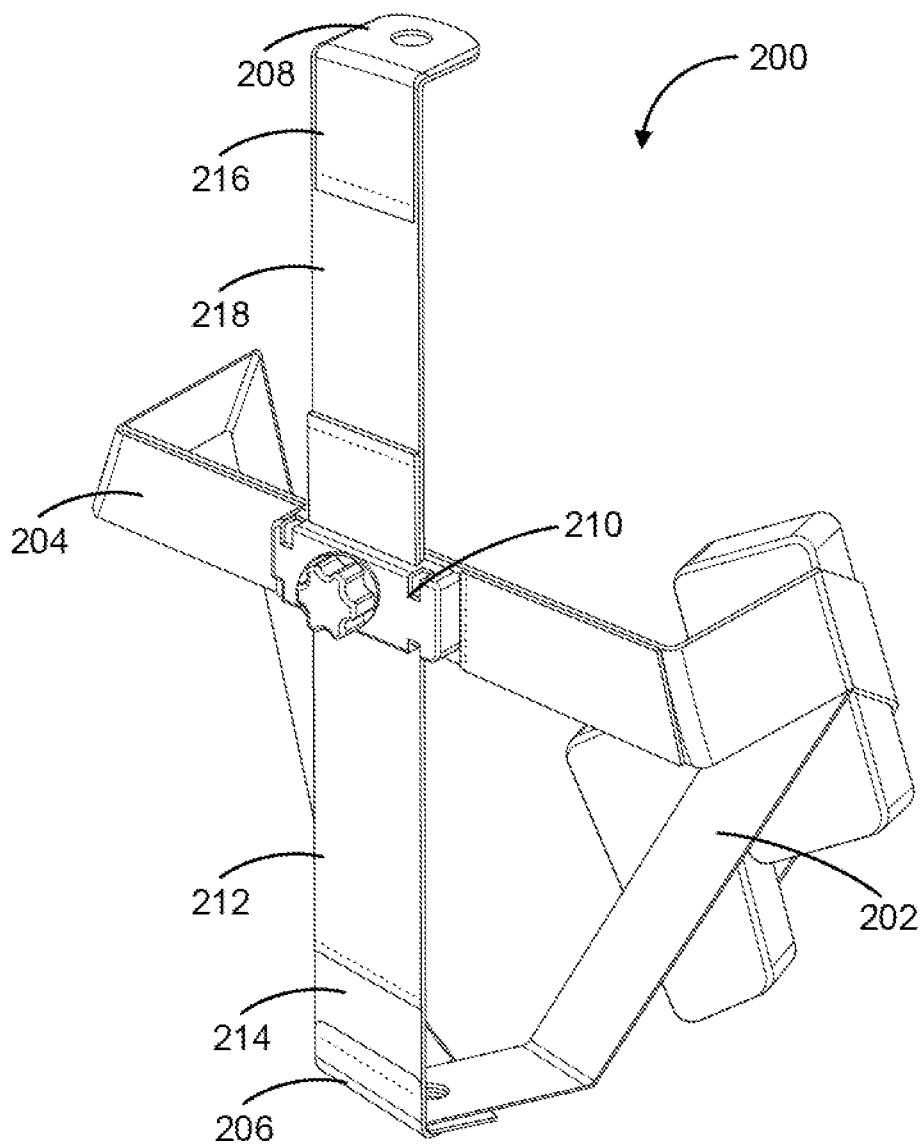
FIG. 2 is a removable device for positioning a user's forearm and hand in relation to a guitar.

For example, turning to FIG. 2, FIG. 2 provides a removable device for positioning a user's forearm and hand in relation to a guitar similar to the device described in FIG. 1. The features described in FIG. 2 can involve environments, operations, and functionalities that are configured or formatted differently, include additional or fewer components, include different types of components, and relate to one another in different ways. The device 200 attaches to a guitar and positions a guitar user's strumming/picking hand and forearm to improve forearm, wrist, and hand dexterity and competence, as well as overall playing ability and form, all of which is self-contained and does not require major modification of existing systems and/or the guitar itself, to do so.

In an example embodiment, as illustrated in FIG. 2, the device 200, like device 100 in FIG. 1, may be made up of a first strap 202, a second strap 204, a first connector 206, a second connector 208, and an adjustment mechanism 210. Unlike FIG. 1, however, FIG. 2 contains a third strap 212 that contains a first elastic portion 214 and a fourth strap 216 that contains a second elastic portion 218. Again, however, FIG. 2 depicts only one example configuration, and other configurations are possible (and may even be preferable).

In this embodiment, the first strap 202, the second strap 204, the first connector 206, the adjustment mechanism 210, the second connector 208, the third strap 212, the fourth strap 216, and/or other components may be made of cotton, leather, vinyl, and/or plastics typically used guitar straps, but it should be understood that any of these components may be made of other materials. Additionally, the first elastic portion 214, the second elastic portion 218, and/or other components may be made of elastic or other similar materials typically used to allow components connected thereto to stretch in relations to one another, but it should be understood that any of these components may be made of other materials Furthermore, the first strap 202, the second strap 204, the first connector 206, the second connector 208, the adjustment mechanism 210, the third strap 212, the first elastic portion 214, the fourth strap 216, the second elastic portion 218, and/or other components may also be modified to interact with a variety of guitar types, styles, and configurations (e.g., acoustic guitars, electric guitars, bass guitars, etc.), and the shape and/or dimensions of any component of device 200 can be modified to fit in or integrate with any guitar.

Turning to the operation of device 200, the device 200 fits over a guitar body with the first strap 202 overlying a first portion of the guitar and the second strap 204 overlying a second portion of the guitar. The first strap 202 and the second strap 204 also join the first connector 206, which is coupled to the first point of the guitar body. The device 200 also contains the adjustment mechanism 210 that is placed behind the guitar body and is connected to the first strap 202 and the second strap 204. In FIG. 2, however, the adjustment mechanism 210 also joins the third strap 212 (containing a first elastic portion 214) and a fourth strap 216 (containing a second elastic portion 218).

In operation, in attaching the device 200 to the guitar, the user has the added benefit of adjusting the tension of the device components by attaching the first connector 206 to the first connection point (shown here as a strap button perforation that connects to a strap button on the bottom-most portion of the guitar body) and attaching the second connector 208 to the second connection point (shown here, again, as a strap button perforation that would connect to a strap button on the bottom-most portion of the guitar body). In doing so, the device 200 is potentially more suited to accommodate different body shapes and styles because the first elastic portion 214 and the second elastic portion 218 allow for a greater range of acceptable displacement between the first connection point and the second connection point when attaching the device 200 to the guitar. Other examples and configurations are possible.

Further, in this embodiment, the adjustment mechanism 210 is illustrated as a geared mechanism, so when the user turns the knob of the adjustment mechanism 210 clockwise, the first strap 202, the second strap 204, the first connector 206, the second connector 208, the adjustment mechanism 210, the third strap 212, the first elastic portion 214, the fourth strap 216, and/or the second elastic portion 218 more taunt in relation to one another, thereby further tightening and securing the device 200 in relation to the guitar body. Other examples and configurations are possible.

Figure 3A:
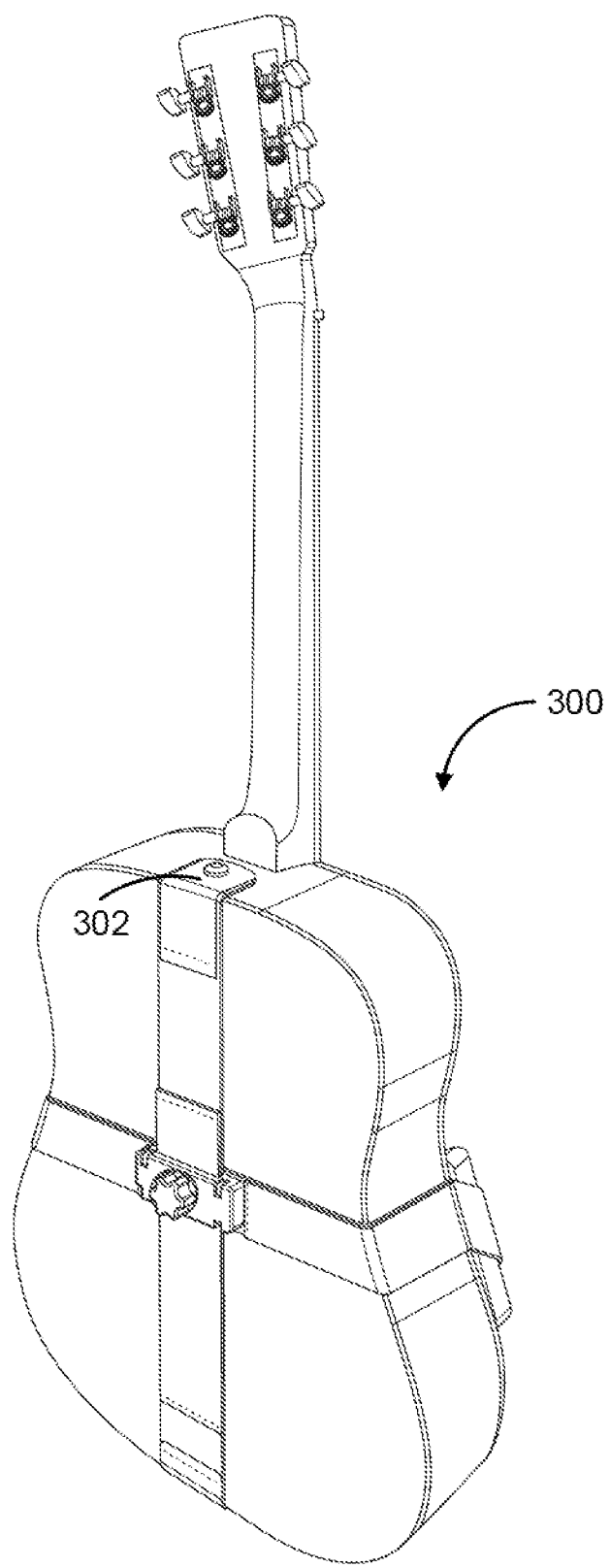
FIG. 3A is a removable device for positioning a user's forearm and hand in relation to a guitar in a first state.
Figure 3B:
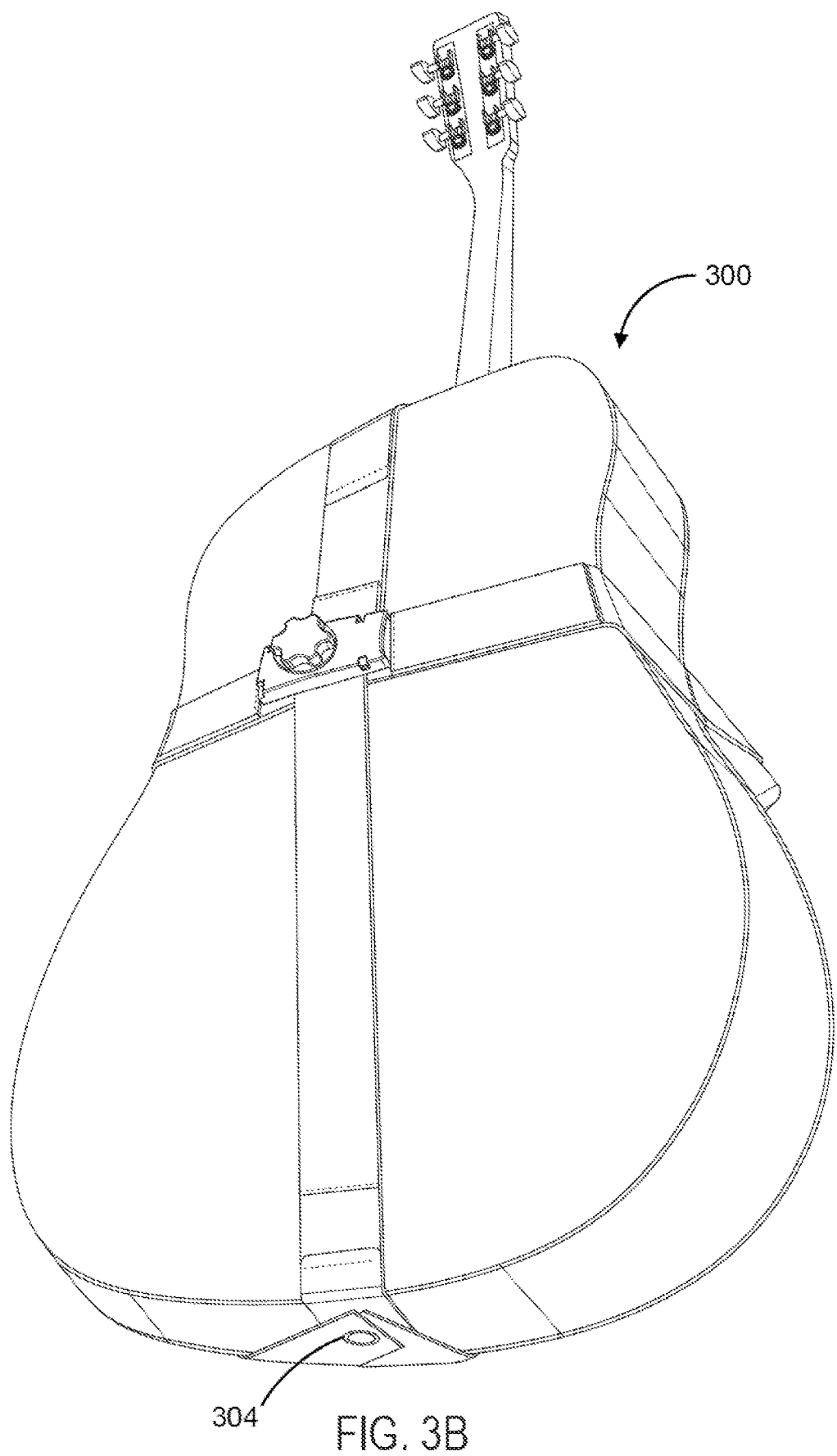
FIG. 3B is the removable device for positioning a user's forearm and hand in relation to a guitar of FIG. 3A in a second state.
Figure 3C:
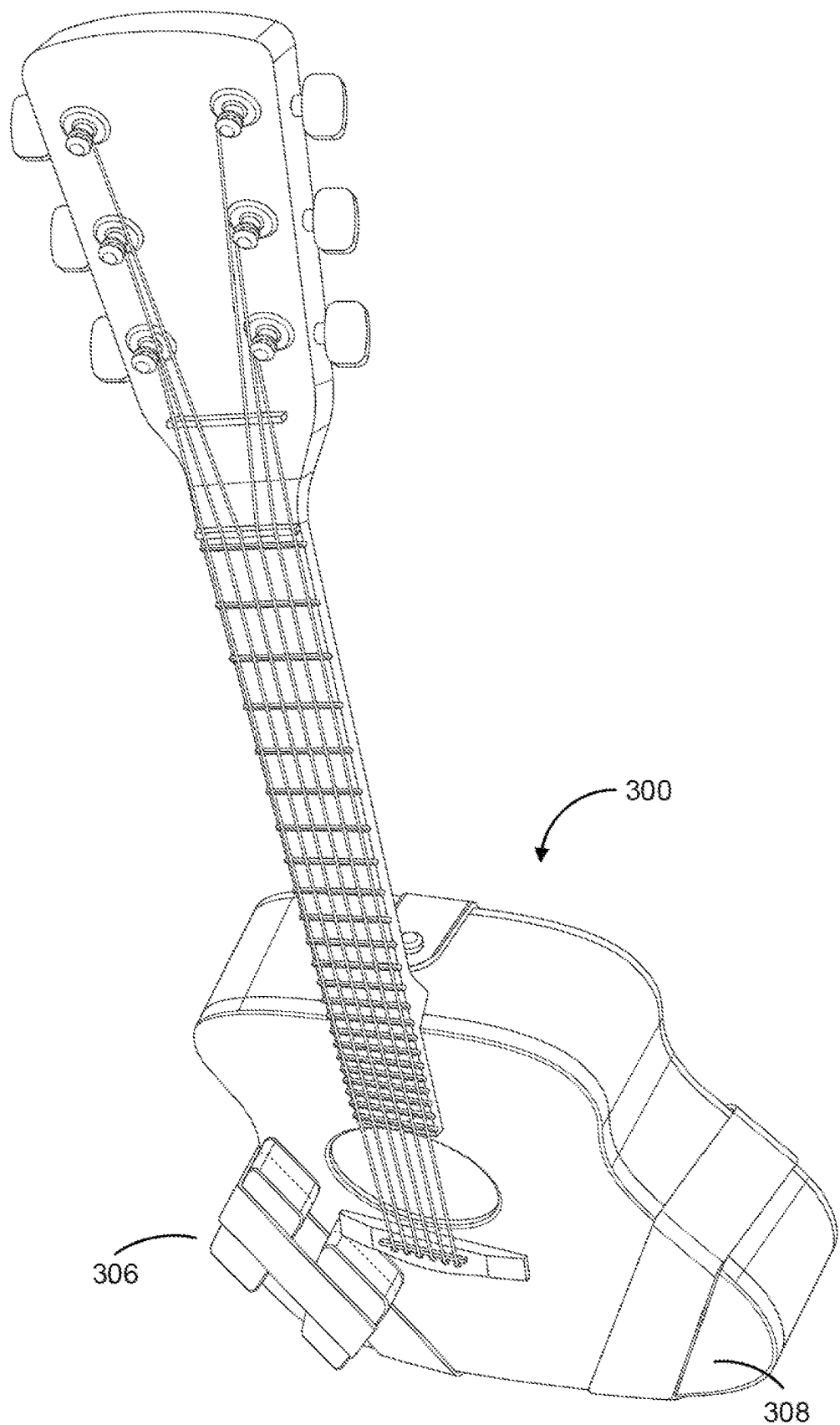
FIG. 3C is the removable device for positioning a user's forearm and hand in relation to a guitar of FIGS. 3A and 3B in a second state.

FIGS. 3A-3C show various views of other example embodiments using the same or similar components of a removable device for positioning a user's forearm and hand in relation to a guitar depicted in FIGS. 1 and 2.

For example, FIGS. 3A-3C provide a removable device for positioning a user's forearm and hand in relation to a guitar similar to the device described in FIG. 2, except as attached to an example dreadnought shaped acoustic guitar. The features described herein can involve environments, operations, and functionalities that are configured or formatted differently, include additional or fewer components, include different types of components, and relate to one another in different ways. The device 300 attaches to a guitar and positions a guitar user's strumming/picking hand and forearm to improve forearm, wrist, and hand dexterity and competence, as well as overall playing ability and form, all of which is self-contained and does not require major modification of existing systems and/or the guitar itself, to do so.

Turning to FIG. 3B, in this illustrated embodiment, the second connector 302 is shown as coupled to a strap button on the top-most portion of the guitar body, near where the guitar body joins the guitar neck. Again, however, the second connector may attach to the guitar body and/or guitar neck using connections other than a strap button. For example, the second connector may attach to the guitar using an adjustable lanyard that extends around from the back of the guitar body and attaches to one or more features on the top portion of the guitar. In a further aspect, the second connector may be adjustable and can attach to these features on the top portion of the guitar using materials and/or mechanisms that do not harm or require any modification of the guitar itself.

Turning to FIG. 3B, in this illustrated embodiment, the first connector 304 is shown as coupled to a strap button on the bottom-most portion of the guitar body. Although the first connector 304 is illustrated to connect with a strap button, in should be understood that the first connector 304 can connect with a variety of types of strap button (e.g., Fender®-style strap buttons, Gibson®-style strap buttons locking strap buttons, etc.) and/or other components (e.g., an input jack for an instrument cable).

Turning to FIG. 3C, in this illustrated embodiment, the first strap 306 is shown as overlying a first portion of the guitar body with the two pads aligning where the guitar user's forearm would be normally be placed when playing and attached thereto a securing portion that further secures the guitar user's forearm when the forearm is placed between the two pads. Additionally, in FIG. 3C, the second strap 308 is shown as overlying a second portion of the guitar body. Other examples and configurations are possible.

Various aspects and embodiments have been disclosed herein, but other aspects and embodiments will certainly be apparent to those skilled in the art. Additionally, the various aspects and embodiments disclosed herein are provided for explanatory purposes and are not intended to be limiting, with the true scope being indicated by the following claims. Furthermore, the singular forms of the articles "a," "an," and "the" include plural references unless the context clearly indicates otherwise.

I claim:

1. A removable device for positioning a user's forearm and hand in relation to a guitar, wherein the removable device comprises:
    a first strap overlying a first portion of the guitar;
    a second strap overlying a second portion of the guitar and joined to the first strap via a first connector, wherein the first connector is coupled to the guitar at a first point;
    an adjustment mechanism overlying a third portion of the guitar and joined to the first strap, the second strap, the first connector, and a second connector, wherein the second connector is coupled to the guitar at a second point; and
    at least one securing portion to accommodate the user's forearm when the user's forearm is placed under the at least one securing portion.

2. The removable device of claim 1, further comprising a first pad.

3. The removable device of claim 2, wherein the first pad is attached to the first strap.

4. The removable device of claim 1, further comprising a first pad and a second pad.

5. The removable device of claim 4, wherein at least one of the first pad and the second pad is attached to the first strap.

6. The removable device of claim 5, further comprising at least one securing portion between the first and second pad to accommodate the user's forearm between the first pad and second pad when the user's forearm is placed under the at least one securing portion.

7. The removable device of claim 1, further comprising at least one elastic portion incorporated in at least one of the first strap, the second strap, the adjustment mechanism, the first connector, and the second connector.

8. The removable device of claim 1, wherein the guitar is an acoustic guitar.

9. The removable device of claim 1, wherein the guitar is an electric guitar.

10. The removable device of claim 1, wherein the guitar is a bass guitar.

11. The removable device of claim 1, wherein at least one of the first strap or second strap contains one or more perforations.

12. The removable device of claim 11, wherein the one or more perforations are arranged to allow access to one or more controls of the guitar.

13. The removable device of claim 1, wherein the first strap is joined to the first connector via an elastic portion.

14. The removable device of claim 1, wherein the first connector is coupled to the guitar at the first point via a strap button.

15. The removable device of claim 1, wherein the adjustment mechanism is joined to the second connector via an elastic portion.

16. The removable device of claim 1, wherein the second connector is coupled to the guitar at the second point via a strap button.

17. The removable device of claim 1, wherein the second connector is coupled to the guitar at the second point via one or more openings on the guitar.

18. The removable device of claim 1, wherein one or more of the first strap or the second strap comprise a high friction material between the one or more of the first strap or the second strap and a surface of the guitar.

19. The removable device of claim 1, wherein one or more of the first strap or the second strap comprise a low friction material between the one or more of the first strap or the second strap and a surface of the guitar.

20. The removable device of claim 1, wherein the adjustment mechanism is an adjustable buckle.

21. A removable device for positioning a user's forearm and hand in relation to a guitar, wherein the removable device comprises:
   a first strap overlying a first portion of the guitar, wherein the first strap comprises at least one elastic portion;
   a second strap overlying a second portion of the guitar and joined to the first strap via a first connector, wherein the first connector is coupled to the guitar at a first point, and wherein the second strap comprises at least one elastic portion;
   an adjustment mechanism overlying a third portion of the guitar and joined to the first strap, the second strap, the first connector, and a second connector, wherein the second connector is coupled to the guitar at a second point, and wherein the second connector comprises at least one elastic portion; and
   at least one securing portion to accommodate the user's forearm when the user's forearm is placed under the at least one securing portion.

22. A removable device for positioning a user's forearm and hand in relation to a guitar, wherein the removable device comprises:
   a first strap overlying a first portion of the guitar;
   a second strap overlying a second portion of the guitar and joined to the first strap via a first connector, wherein the first connector is coupled to the guitar at a first point;
   a third strap overlying a third portion of the guitar and joined to the first strap and the second strap via the first connector;
   a fourth strap overlying a fourth portion of the guitar and coupled to the guitar at a second point via a second connector;
   an adjustment mechanism overlying a fifth portion of the guitar and joined to the first strap, the second strap, the third strap, and the fourth strap; and
   at least one securing portion to accommodate the user's forearm when the user's forearm is placed under the at least one securing portion.

* * * * *